July 26, 1955  O. STEINER ET AL  2,713,815
RANGE FINDER FOR PHOTOGRAPHIC CAMERAS Filed Sept. 13, 1952  2 Sheets-Sheet 1

INVENTOR.
OSCAR STEINER
ROBERT L. DALTON
BY
ATTORNEY

July 26, 1955  O. STEINER ET AL  2,713,815
RANGE FINDER FOR PHOTOGRAPHIC CAMERAS Filed Sept. 13, 1952  2 Sheets-Sheet 2

INVENTOR.
OSCAR STEINER
ROBERT L. DALTON
BY
ATTORNEY

United States Patent Office 2,713,815
Patented July 26, 1955

2,713,815
RANGE FINDER FOR PHOTOGRAPHIC CAMERAS

Oscar Steiner and Robert L. Dalton, Irondequoit, N. Y., assignors to Graflex, Inc., Rochester, N. Y., a corporation of Delaware Application September 13, 1952, Serial No. 309,432

5 Claims. (Cl. 95—44)

The present invention relates to rangefinders and more particularly to coupled rangefinders for photographic cameras.

It is common practice to attach a rangefinder to a camera so that the camera may be focused properly upon the object which is to be photographed. Conventional attached rangefinders have two mirrors disposed vertically one above the other, the upper mirror being fixed and being of the semi-transparent type, and the lower mirror being rotatable and being coupled to the lens board or support for the front lens of the camera, so that, when the lens board or support is moved in or out along the camera bed, the lower mirror is swung on its axis of rotation. The user, upon looking into the eyepiece of the rangefinder, sees two images of the object to be photographed, one reflected from the lower mirror and the rear face of the upper mirror, and the other visible directly through the transparent upper mirror. By adjusting the lens board or support of the camera forward or back these two images may be brought together, and when this is done the camera is in proper focus.

To rotate the lower mirror upon adjustment of the lens board or support, complicated lever systems are required in conventional attached rangefinders. These add to the cost of the rangefinder and increase the likelihood of the rangefinder getting out of adjustment. Furthermore, in most rangefinders, the motion derived from the adjustment of the lens bed is reduced at the rangefinder arm.

One object of the present invention is to provide a coupled rangefinder attachment for photographic cameras having a simpler coupling mechanism between the lens board, or support for the front lens of the camera, and the rangefinder than has heretofore been employed.

Another object of the present invention is to provide a coupling attachment in which the maximum motion of the coupling linkage is kept right up to the last member of the linkage.

Another object of the invention is to provide a coupling mechanism for a coupled rangefinder which can readily be used with lenses of different focal lengths.

A further object of the invention is to provide a coupled rangefinder in which the motion of adjustment of the lens board is transmitted to the rotary mirror through a cam and follower.

A still further object of the invention is to provide a coupled rangefinder having a simple cam for operating the rotatable mirror of the rangefinder, which cam can readily be removed and replaced to suit the lens being employed on the camera.

A further object of the invention is to provide a coupled rangefinder in which the mechanism for transmitting the motion of the lens board to the rotatable mirror of the rangefinder includes a cam and follower, and the follower is in the form of an eccentric roller that is rotatably adjustable to provide fine adjustment for infinity positions of the lenses.

Another object of the invention is to provide a coupling mechanism for a rangefinder for photographic cameras which will permit the lower mirror of the rangefinder to be fixed and the upper semi-transparent mirror to be rotatable so that more sensitive and more accurate results can be obtained through use of the rangefinder.

Still other objects of the invention are to provide a rangefinder for attachment to a photographic camera which will be more durable than conventional rangefinders and more stable thereby insuring greater accuracy and longer life.

Other objects of the invention will be apparent hereinafter from the specfication and from the recital of the appended claims.

Figure 5:
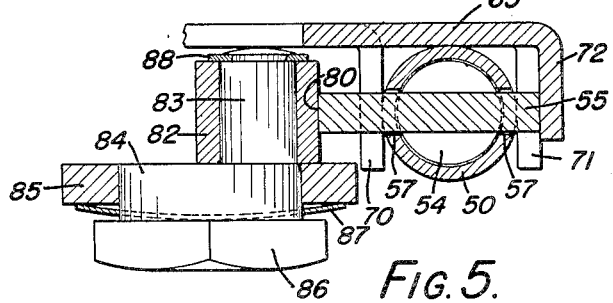
Figure 4:
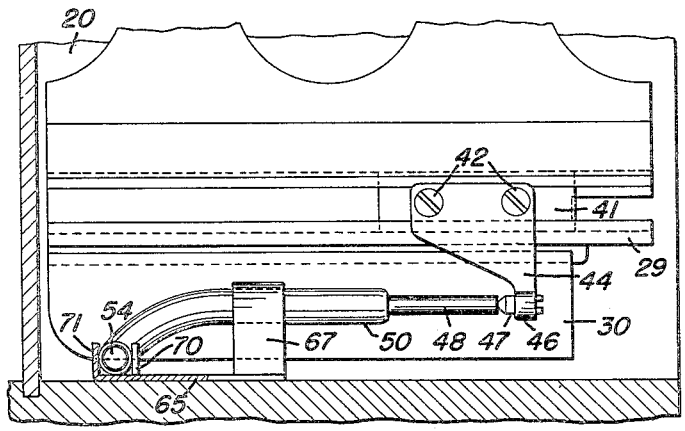
Figures 2, 3:
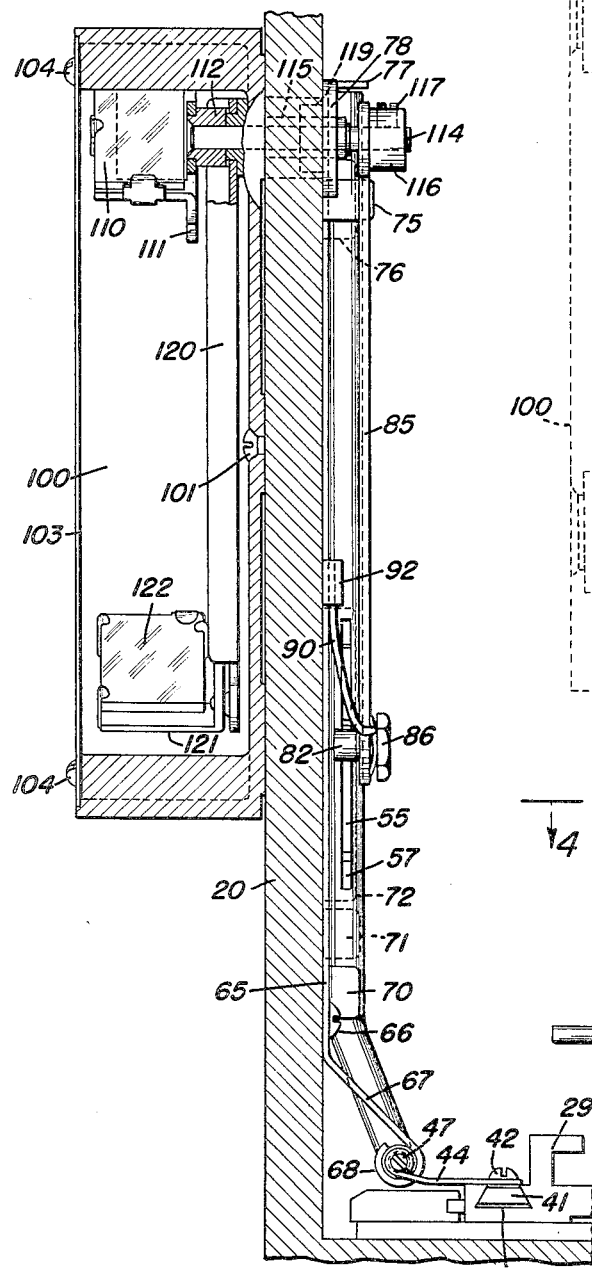
Fig. 2 is a fragmentary vertical section through the camera housing showing fragmentarily the objective slide of the camera and the mechanism of the present invention for coupling that slide to the transparent mirror of the rangefinder.
Fig. 3 is a part side elevation, part section, looking from the right at Fig. 2 and showing in dotted lines and diagrammatically the principal parts of the rangefinder.

Fig. 4 is a fragmentary horizontal section through the camera box showing the connection between the objective slide and the coupling mechanism, the section being taken through the coupling linkage on the line 4—4 of Fig. 3, looking in the direction of the arrows; and Fig. 5 is a section on a greatly enlarged scale through the coupling linkage, taken on the line 5—5 of Fig. 3, looking in the direction of the arrows.

Referring now to the drawings by numerals of reference, 20 denotes the box or case of a conventional camera; and 22 designates the bed of this camera. The bed is hinged to the camera box or casing 20 and is held in operative position by the side arms 23.

Figure 1:
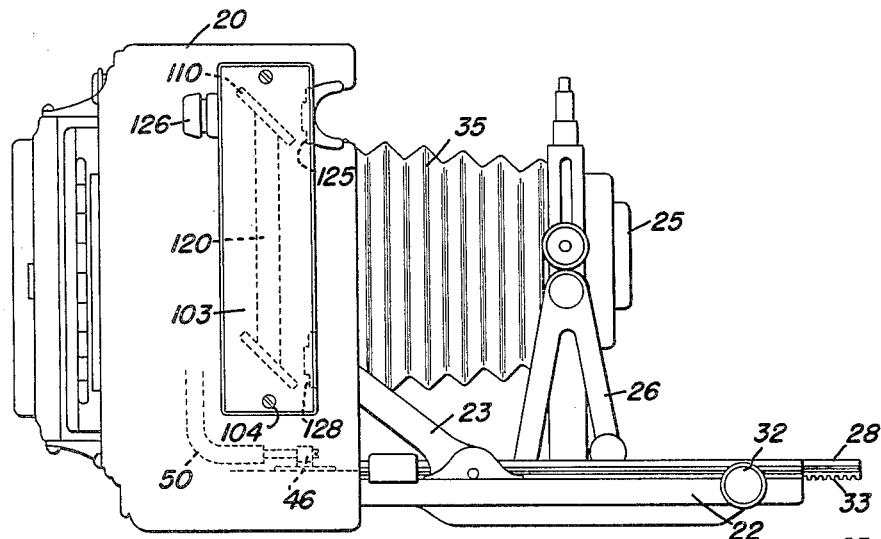
Fig. 1 is a side elevation of a camera in open position and showing attached thereto a rangefinder such as may be operated by the coupling mechanism of the present invention, and illustrating, also, fragmentarily and in dotted lines part of the coupling mechanism.

The objective or front lens 25 of the camera is mounted in conventional manner by means of brackets 26 to a slide (not shown) which is adapted to be clamped in conventional manner to a pair of parallel rails 28. The rails 28 are connected to aligned parallel rails 29 by links or other conventional connecting means (not shown). The rails 28 and 29 are mounted to slide in the camera box 20 and on the bed 22, respectively. Thus, any movement imparted to the rails 28 is transmitted to the rails 29 causing them to travel in the guideways 30 (Fig. 4) of the camera box. The rails 28 are adjusted as usual by the focusing knob 32 (Fig. 1). This knob carries pinions (not shown) which engage racks 33 formed on the undersides of the rails 28. The camera objective 25 is connected at one end to the bellows 35 of the camera in conventional manner. Only one rail 28 and one rail 29 are shown in the drawings of the present application but in conventional manner, as stated, there are two parallel rails 28 connected by links to two parallel rails 29.

One rail 29 has a dove-tailed groove 40 (Figs. 2 and 4) formed in it. Mounted in this groove is a correspondingly shaped block 41. Secured to this block, as by means of screws 42, is a bracket 44. The terminal end of this bracket is curled upon itself, as denoted at 46, and threaded internally to receive an adjustable screw or follower 47. This screw engages one end of a plunger 48 (Figs. 3 and 4).

This plunger is mounted to reciprocate in one end of a tube 50 which is bent to right-angular shape. The portion 51 of the plunger, which slides in the tube, is of enlarged diameter and the tube is crimped inwardly at the end, which receives the plunger, to prevent the plunger from sliding out of the tube.

The plunger engages at its inner end with the lowermost of a series of balls 52 which abut against one another and transmit the motion of the plunger 51 to the ball plunger 54, which is enclosed within and slides in the tube.

This ball plunger engages the lower surfaces 56 of a cam 55 which is slidable in the tube and which projects outwardly at both sides through aligned diametral slots 57 (Fig. 5) in the tube. The cam is held resiliently in engagement with the ball plunger 54 by a spring-pressed plunger 58 which engages the upper surface 59 of the cam. The plunger 58 is held in engagement with the cam by a coil spring 60, which is housed in the tube 50.

The tube 50 is mounted in the camera case on a bracket 65, which is made of sheet metal and which is secured to the case by screws 66. The bracket has an inwardly bent arm 67 at its lower end which has its free end curled upon itself, as denoted at 68 (Figs. 2 and 3), to receive and support the lower portion of the tube 50. The bracket has two lateral wings 70 and 71 bent inwardly from it which are displaced from one another axially of the tube and which engage the tube at opposite sides thereof to brace and hold the tube laterally. The bracket has a lateral wing 72 bent inwardly therefrom against which the back side 74 of the cam 55 seats. The bracket has parallel lateral wings 75 and 76 near its upper end which brace and hold the tube 50 against lateral movement. The bracket has an inwardly bent wing 77 at its upper end which serves as a seat for the upper end of the coil spring 60. The bracket has a forwardly projecting arm 78 at its upper end.

The forward active surface 80 of the cam 55 engages a roller 82 (Figs. 3 and 5) which is mounted on the stud 83 of an eccentric 84 that is journaled in the lower end of an arm 85. The eccentric is formed at one end with a square head 86. It is resiliently held against axial and angular movement relative to the arm 85 by a spring washer 87 which is interposed between the head 86 and the arm 85. A washer 88 holds roller 82 on the stud 83 abutting against the arm 85, the outer end of the stud 83 being riveted over this washer.

The roller 82, which constitutes a follower, is held resiliently in engagement with the active surface 80 of the cam 55 by a spring 90 (Figs. 2 and 3), which engages at one end over the arm 85 and which is held at its opposite end in a lug 92 formed on the bracket 65.

The rangefinder itself is housed within a casing 100 which is secured to the outside of the camera case or box 20 by screws 101 (Fig. 2). The casing is rectangular in shape. Access may be had to its interior by removing its cover 103 (Fig. 1). This cover is secured in position at one side of the casing by screws 104.

The rangefinder may be similar in construction to that disclosed in the pending application of Clarence E. Smith et al., Serial No. 200,414, filed December 12, 1950, now Patent No. 2,693,744, and assigned to the assignee of the present application. It is not necessary to describe the construction of the rangefinder in detail. Suffice it to say that there is a semi-transparent mirror 110 mounted upon a support 111 which is brazed or soldered to a collar 112 that has splined engagement with a shaft 114. This shaft is journaled in a bearing 115 in the casing 100 and in the camera box 20; and it extends through aligned holes in the arm 78 of the bracket 65 and the arm 85. The arm 85 has a collar 116 soldered or brazed thereto. This collar is secured to the shaft 114 by a set-screw 117 so that as the arm 85 is moved through engagement of the roller 82 with the cam 55, the motion of the arm is transmitted to the shaft 114 and to the semi-transparent mirror 110. A nut 119 which threads onto the bearing 115 serves to secure the bearing tight in the rangefinder casing and in the camera box.

Silver-soldered or otherwise secured to the bearing member 115 is a beam 120. Mounted upon this beam at the free end thereof is a support of bracket 121 which carries a mirror or reflector 122.

The semi-transparent mirror 110 is aligned with a window opening 125 (Figs. 1 and 3) in the front wall of the rangefinder casing and with an eyepiece 126 which is mounted in the rear wall of the casing. The mirror or reflector 122 registers with a window opening 128 in the front wall of the rangefinder casing.

From the preceding description, it will be seen that as the rail 29 is moved forward or back in the camera case by focusing adjustment of the lens, such motion is imparted through the screw 47, plunger 48, balls 52, plunger 54, cam 55, roller 82, arm 85, and shaft 114 to the semi-transparent mirror. Thus, the semi-transparent mirror 110 can be made to track relative to the objective lens of the camera so that as the camera is focused the mirror 110 will move correctly as required for the rangefinding operation. The photographer sights through the eyepiece 126 and when the two images of the object to be photographed seen through the window openings 125 and 128, respectively, are aligned he knows that the camera is in focus.

For different lenses different cams 55 can be used. It is easy to substitute one cam for another. The cam 55 is simply pushed down in the slots 57 far enough to clear the roller 82, and then can be pulled forwardly out of these slots. Then a new cam can be shoved into the slot. The cam surface 80 of each different cam provided for use in the coupling mechanism is, of course, shaped in accordance with the focal length of the particular lens of the camera with which it is to be used. Each cam 55 is simply a flat plate; and the slots 57 are made long enough to permit a cam plate to be readily removed and replaced. The upper and lower surfaces 56 and 59 of each cam 55 converge forwardly so that each cam is held in the tube 50 by spring pressure, the spring 60 forcing the plunger 58 into engagement with the inclined upper wall 59 of the cam and the plunger 54 engaging the converging lower wall 56 of the cam. The angle on the cam top surface 59, which is engaged by the spring-pressed plunger 58, keeps the cam back against the stop wing 72 of the bracket.

The eccentric 84, in conjunction with the follower screw 47, permits of precise angular adjustment of the mirror 110 so as to set the mirror correctly so that the infinity point of the rangefinder may correspond to the infinity point of the lens being used on the camera.

Because of the simple construction of the mechanism described the maximum motion of the linkage is kept right up to the last member. This insures great accuracy. The movement of the cam corresponds directly to the movement of the yoke or rail.

Because of the simplicity of the linkage transmitting motion from the lens board of the camera directly to the semi-transparent mirror 110 accuracy and low cost are achieved.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. In combination, a camera having an objective lens that is adjustable for focusing, a rangefinder attached to said camera, said rangefinder including a pivotally mounted reflector, and means for coupling said lens to said reflector to pivot said reflector upon focusing adjustment of said lens, comprising a member connected to said lens to move in one plane upon adjustment of said lens, a right angularly bent tube, a cam removably mounted in said tube and reciprocable rectilinearly therein at right angles to the plane of movement of said member and projecting outwardly through a slot in said tube, a series of balls mounted to roll in said tube and to abut against one another, means connecting the ball at one end of the series directly with said member, a plunger operatively connected with the ball at the other end of the series, said plunger engaging the cam at one side of the cam, a spring-pressed plunger mounted in said tube and engaging the opposite side of the cam, said opposite side of the cam being inclined to the direction of movement of the cam so that pressure of said spring-pressed plunger on said opposite side of the cam tends to hold said cam in said tube, a movable follower engaging said cam, and means for transmitting motion of said follower to said reflector to pivot said reflector upon movement of said follower.

2. In combination, a camera having an objective lens that is adjustable for focusing, a rangefinder attached to said camera, said rangefinder including a pivotally mounted reflector, and means for coupling said lens to said reflector to pivot said reflector upon focusing adjustment of said lens, comprising a member connected to said lens to move in one plane upon adjustment of said lens, a right angularly bent tube, a cam removably mounted in said tube and reciprocable rectilinearly therein at right angles to the plane of movement of said member and projecting outwardly through a slot in said tube, a series of balls mounted to roll in said tube and to abut against one another, means connecting the ball at one end of the series directly with said member, a plunger operatively connected with the ball at the other end of the series, said plunger engaging the cam at one side of the cam, a spring-pressed plunger mounted in said tube and engaging the opposite side of the cam, the two said sides of the cam diverging from one another from front to rear of the cam so that pressure of said spring-pressed plunger on said opposite side of the cam tends to hold said cam in said tube, a movable follower engaging said cam, and means for transmitting motion of said follower to said reflector to pivot said reflector upon movement of said follower.

3. In combination, a camera having an objective lens that is adjustable for focusing, a rangefinder attached to said camera, said rangefinder including a pivotally mounted reflector, and means for coupling said lens to said reflector to pivot said reflector upon focusing adjustment of said lens, comprising a member connected to said lens to move upon focusing adjustment of said lens, a tubular guide, a cam removably mounted in said guide and reciprocable rectilinearly therein and projecting outwardly through a slot in said guide, means for moving said cam upon movement of said member, said cam being in the form of a flat plate and having an active front face and a side diverging from front to back, a spring-pressed plunger engaging said side of said cam to retain said cam in said guide, and means for transmitting motion from said cam to said reflector to pivot said reflector upon movement of said cam.

4. In combination, a camera having an objective lens that is adjustable for focusing, a rangefinder attached to said camera, said rangefinder including a pivotally mounted reflector, and means for coupling said lens to said reflector to pivot said reflector upon focusing adjustment of said lens, comprising a member connected to said lens to move upon focusing adjustment of said lens, a tubular guide, a cam removably mounted in said guide and reciprocable rectilinearly therein and projecting outwardly through a slot in said guide, means including a plunger that engages one side of said cam to transmit motion from said member to said cam, a spring-pressed plunger mounted in said guide and engaging said cam at the opposite side from the first-named plunger, said slot being longer than said cam whereby said cam may be removed from said tube through said slot, said cam being a flat plate having an active front face and having its two said sides diverging from front to back whereby said spring-pressed plunger tends to retain said cam in said guide, and means for transmitting motion from said cam to said reflector to pivot said reflector upon movement of said cam.

5. In combination, a camera having an objective lens that is adjustable for focusing, a rangefinder attached to said camera, said rangefinder including a pivotally mounted reflector, and means for coupling said lens to said reflector to pivot said reflector upon focusing adjustment of said lens, comprising a member connected to said lens and movable in one plane upon adjustment of said lens, a right angularly bent tube, a cam removably mounted in said tube and reciprocable rectilinearly therein at right angles to the plane of movement of said member and projecting at its forward side through a slot in said tube, a series of balls mounted to roll in said tube and abutting against one another, means connecting the ball at one end of the series directly with said member, a plunger contacting the ball at the other end of the series and engaging the lower side of said cam, a spring-pressed plunger mounted in said tube and engaging the upper side of said cam, said cam being a flat plate and having its upper and lower sides diverging from front to rear of the cam whereby said spring-pressed plunger tends to hold said cam in said tube, a roller engaging the forward side of said cam, a pivotal arm on which said roller is mounted for eccentric adjustment, said arm being secured to said reflector to pivot said reflector upon movement of said roller, and means for resiliently holding said roller in engagement with the forward side of said cam, said slot being longer than said cam whereby said cam may be removed from said tube through said slot.

References Cited in the file of this patent

UNITED STATES PATENTS

| 2,135,989 | Nagel | Nov. 8, 1938 |
| 2,376,982 | Schwartz et al. | May 29, 1945 |
| 2,420,018 | Semerau | May 6, 1947 |

FOREIGN PATENTS

| 267,601 | Great Britain | Mar. 17 1927 |
| 599,981 | Germany | July 12, 1934 |